(12) United States Patent
Lim et al.

(10) Patent No.: US 10,647,246 B2
(45) Date of Patent: May 12, 2020

(54) METHOD OF AUTOMATICALLY ADJUSTING LEVELING OF PIXEL LIGHT HEADLAMP FOR VEHICLE

(71) Applicants: Hyundai Motor Company, Seoul (KR); Kia Motors Corporation, Seoul (KR)

(72) Inventors: Jung Wook Lim, Seoul (KR); Jik Soo Shin, Incheon (KR); Keun Sig Lim, Yongin-si (KR); Ki Hong Lee, Seoul (KR); Byoung Suk Ahn, Gwacheon-si (KR)

(73) Assignees: Hyundai Motor Company, Seoul (KR); Kia Morors Corporation, Seoul (KR)

( * ) Notice: Subject to any disclaimer, the term of this patent is extended or adjusted under 35 U.S.C. 154(b) by 212 days.

(21) Appl. No.: 15/648,273

(22) Filed: Jul. 12, 2017

(65) Prior Publication Data

US 2018/0043818 A1 Feb. 15, 2018

(30) Foreign Application Priority Data

Dec. 8, 2016 (KR) .................. 10-2016-0166445

(51) Int. Cl.
*B60Q 1/08* (2006.01)
*B60Q 1/14* (2006.01)
*F21S 41/675* (2018.01)
*B60Q 1/115* (2006.01)
*G01M 11/06* (2006.01)

(52) U.S. Cl.
CPC .............. *B60Q 1/085* (2013.01); *B60Q 1/115* (2013.01); *B60Q 1/143* (2013.01); *F21S 41/675* (2018.01); *G01M 11/065* (2013.01); *G01M 11/068* (2013.01); *B60Q 2300/122* (2013.01); *B60Q 2300/314* (2013.01); *B60Q 2300/334* (2013.01)

(58) Field of Classification Search
CPC ... F21S 41/675; G01M 11/064; G01M 11/065
See application file for complete search history.

(56) References Cited

U.S. PATENT DOCUMENTS

2017/0129389 A1* 5/2017 Asaoka ................... B60Q 1/08

FOREIGN PATENT DOCUMENTS

KR 10-1220063 B1 1/2013

* cited by examiner

*Primary Examiner* — Andrew J Coughlin
*Assistant Examiner* — Zachary J Snyder
(74) *Attorney, Agent, or Firm* — Morgan, Lewis & Bockius LLP

(57) ABSTRACT

Disclosed is a method of automatically adjusting the leveling of a pixel light headlamp for a vehicle, which may automatically adjust the leveling of a headlamp that is configured for implementing a pixel light using a DMD optical system.

8 Claims, 7 Drawing Sheets

METHOD OF AUTOMATICALLY ADJUSTING LEVELING OF PIXEL LIGHT HEADLAMP FOR VEHICLE

CROSS REFERENCE(S) TO RELATED APPLICATIONS

The present application claims priority to Korean Patent Application No. 10-2016-0166445 filed on Dec. 8, 2016, the entire contents of which is incorporated herein for all purposes by this reference.

BACKGROUND OF THE INVENTION

Field of the Invention

The present invention relates generally to a method of automatically adjusting the leveling of a pixel light headlamp for a vehicle and, more particularly, to technology related to a method of automatically adjusting the leveling of a headlamp that is capable of implementing a pixel light using a digital micromirror device (DMD) optical system.

Description of Related Art

Generally, a vehicle headlamp, which is intended to emit light to a region ahead of a vehicle, is one of the security devices by which the forward visibility of a driver is secured within a wide range to prevent the occurrence of accidents.

Such a headlamp is limited in its forward emission angle by related regulations so the vision of a driver of an opposite vehicle is not obstructed. When necessary, the emission angle of the headlamp may be adjusted using horizontal and vertical aiming devices.

Before a complete vehicle is initially released, the emission angle of a headlamp is adjusted to comply with related regulations. However, after the release of the vehicle the emission angle of the headlamp changes due to the status of the vehicle, aging of vehicle parts, etc. Therefore, in the prior art, a worker has adjusted the level of the headlamp by personally and manually manipulating an aiming device. There is a disadvantage in the inconvenience caused by when work occurs, and it is difficult to precisely adjust leveling.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of automatically adjusting the level of a headlamp that is configured for implementing a pixel light using a digital micromirror device (DMD) optical system, which can eliminate the inconvenience caused by the leveling of a head lamp to be manually adjusted, thus improving convenience and facilitating leveling to be more precisely adjusted.

According an aspect of the present invention is directed to providing a method of automatically adjusting the leveling of a pixel light headlamp for a vehicle, the method of automatically adjusting the leveling of a headlamp equipped with a DMD optical system, the method including a test light emission operation of emitting test light to a target located ahead of a vehicle in a state in which the vehicle is stopped; an image information acquisition operation of acquiring a test light image formed on the target, as image information, using a camera provided in the vehicle; a comparison operation of comparing the acquired image information of the test light image with reference information that is input to a controller; and a leveling correction operation of, when the image information is different from the reference information, controlling, by the controller, an operation of a leveling actuator until the image information becomes identical to the reference information.

The acquired image information of the test light image has a rectangular shape in which an upper side and a lower side that face each other and a left side and a right side that face each other are connected, and image information acquired using a camera when the target is in a base state in which the target stands vertically to a ground surface and has no slope in a forward and backward direction while the target stands in parallel to the vehicle and then has no slope in a left and right direction, may be an image in which two respective facing sides are parallel to each other and have an identical length.

The image information compared with the reference information of the controller in the comparison operation may include first information about coordinate values of a single point specified in the image information acquired when the target is in the base state; second information about a distance from the center of a light source of the headlamp to the target; third information about a left and right slope of the target; and fourth information about a forward and backward slope of the target.

The first information may indicate coordinate values corresponding to any one selected from among coordinate values of a first corner at which an upper side and a right side meet in the image information acquired when the target is in the base state, coordinate values of a second corner at which the right side and a lower side meet in the image information, coordinate values of a third corner at which the lower side and a left side meet in the image information, and coordinate values of a fourth corner at which the left side and the upper side meet in the image information.

The second information may be configured wherein one of the upper side and the lower side of the image information is set to a reference side, the distance from the light source center of the headlamp to the target is set to the distance of the reference information that is input to the controller when the length of the reference side is identical to a length of the reference information that is input to the controller upon comparing the lengths with each other, and the distance from the light source center of the headlamp to the target is determined by a proportional expression that uses the length and a distance of the reference information that is input to the controller with the length of the reference side when the length of the reference side is not identical to the length of the reference information that is input to the controller.

When coordinate values obtained from the first information are not identical to the coordinate values of the reference information that is input to the controller upon comparing the coordinate values with each other based on the distance obtained from the second information, the controller may change the height of an optical axis of the headlamp by controlling the operation of the leveling actuator until the coordinate values to be subsequently obtained from the first information become identical to the coordinate values of the reference information that is input to the controller.

The third information may be either the slope of a straight line that connects the top end portion of the left side of the image information to the top end portion of the right side thereof or the slope of a straight line that connects the bottom end portion of the left side to the bottom end portion of the right side when the lengths of the left side and the right side of the image information are not identical to each other.

When the lengths of the left side and right side of the acquired image information are not identical to lengths of the reference information that is input to the controller upon comparing the lengths with each other based on the distance obtained from the second information and the left and right slope of the target obtained from the third information, the controller may correct horizontal leveling of the headlamp by controlling the operation of the leveling actuator until the lengths of the left side and the right side of the image information to be subsequently obtained become identical to the lengths of the reference information that is input to the controller.

The fourth information may be either the slope of a straight line that connects the right end portion of the upper side of the acquired image information to the right end portion of the lower side thereof or the slope of a straight line that connects the left end portion of the upper side to the left end portion of the lower side when the lengths of the upper side and the lower side of the acquired image information are not identical to each other.

When the lengths of the upper side and the lower side of the acquired image information are not identical to lengths of the reference information that is input to the controller upon comparing the lengths with each other based on the distance obtained from the second information and the forward and backward slope of the target obtained from the fourth information, the controller may correct vertical leveling of the headlamp by controlling the operation of the leveling actuator until the lengths of the upper side and the lower side of the image information to be subsequently obtained become identical to the lengths of the reference information that is input to the controller.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
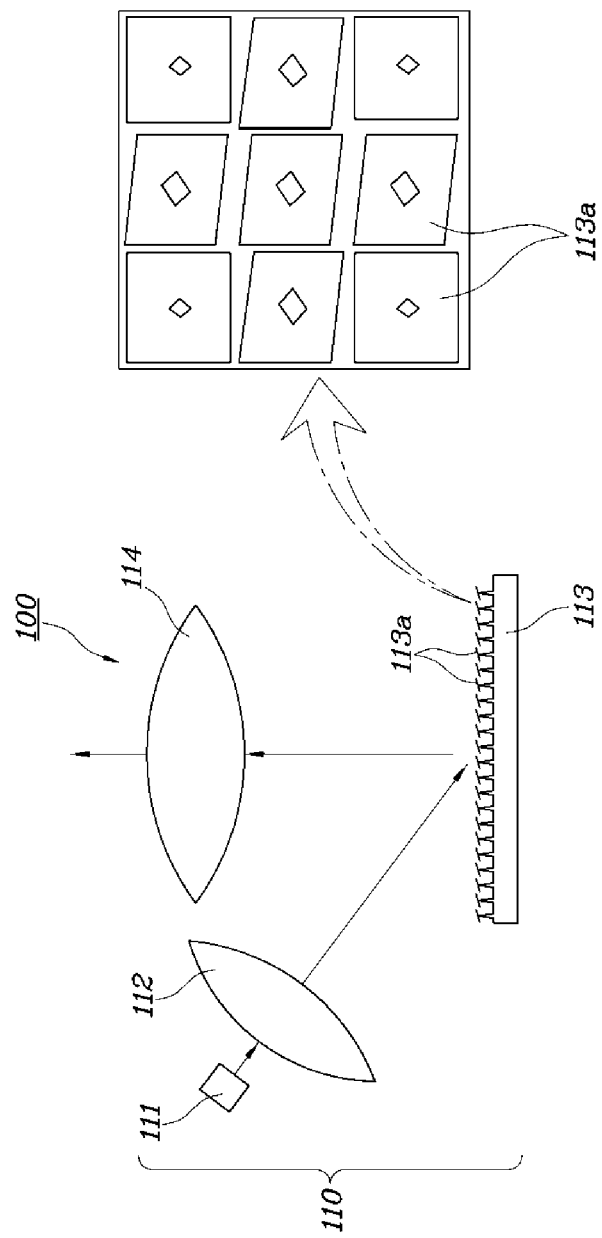
FIG. 1 is a view for explaining a DMD optical system of a headlamp according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention through the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a method of automatically adjusting the leveling of a pixel light headlamp for a vehicle according to exemplary embodiments of the present invention will be described in detail with reference to the accompanying drawings.

As shown in FIG. 1 to FIG. 10, a headlamp 100 according to an exemplary embodiment of the present invention is configured for implementing a pixel light using a digital micromirror device (DMD) optical system 110. The DMD optical system 110 includes a light source 111, condensing lens 112, DMD chip 113, and an imaging lens 114.

The DMD chip 113 is configured wherein hundreds of thousands of micro-mirrors 113*a* having micro sizes are disposed in a checkerboard array. Here, the micro-mirrors 113*a* include a multi-layer material having an electrical signal, are provided with a function of reflecting incident light, and are configured to individually perform a tilting operation at a very high speed in response to a digital input signal based on a pulse width modulation (PWM) driving scheme.

That is, each of the micro-mirrors may perform a tilting operation of rotating at an angle of approximately +12° or −12° depending on the ON or OFF state of the digital input signal, and may adjust the brightness of emitted light using the ratio of a time during which the corresponding micro-mirror is in an ON state to a time during which the micro-mirror is in an OFF state.

Since the headlamp 100 equipped with the DMD optical system 110 may implement a patterns of beams that are externally emitted (e.g. a low beam, a high beam, etc.) through individual tilting operations of the micro-mirrors 113*a* corresponding to respective pixels, the headlamp 100 is advantageous in that there is no need to provide a shield to implement various beam patterns as in the case of a conventional typical optical system.

To automatically adjust the leveling of the headlamp 100 equipped with the DMD optical system 110, the vehicle may further include a camera 200 for acquiring image information, a leveling actuator 300 for adjusting the leveling of the headlamp 100, and a controller 400 configured for controlling the operation of the leveling actuator 300 using the acquired image information, in addition to the headlamp 100.

In accordance with the present invention, a method of automatically adjusting the leveling of the headlamp 100 equipped with the DMD optical system 110 may include a test light emission step of emitting test light 2 to a target 1 located ahead of the vehicle in a state in which the vehicle is stopped; an image information acquisition step of acquiring a test light image 3 formed on the target 1, as image information 10, using the camera 200 provided in the vehicle; a comparison step of comparing the acquired image information 10 of the test light image with reference information that is input to the controller 400; and a leveling correction step of controlling, by the controller 400, the operation of the leveling actuator 300 until the image information becomes identical to the reference information when the image information 10 is different from the reference information.

Figure 2:
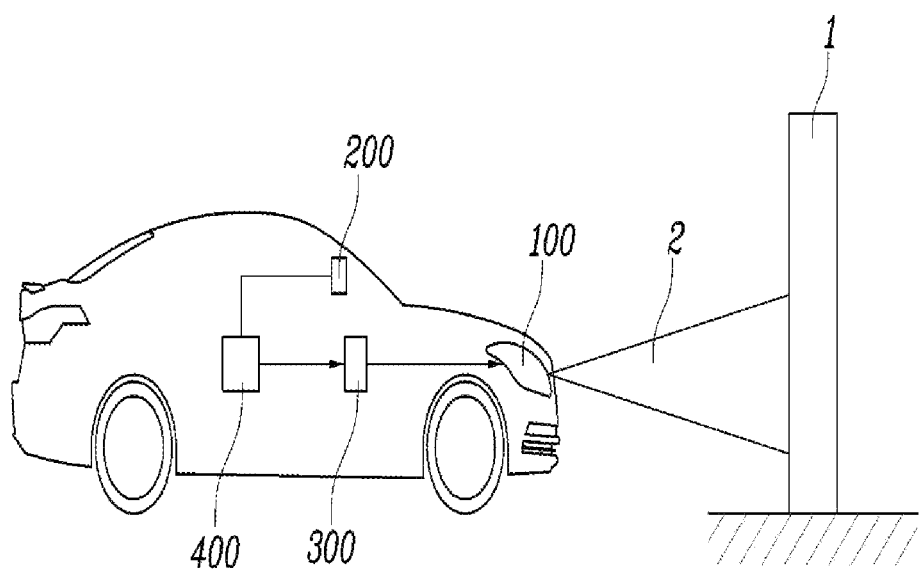
FIG. 2 is a side view of a structure in which test light is emitted to a target located ahead of a vehicle using a headlamp equipped with a DMD optical system.
Figure 3:
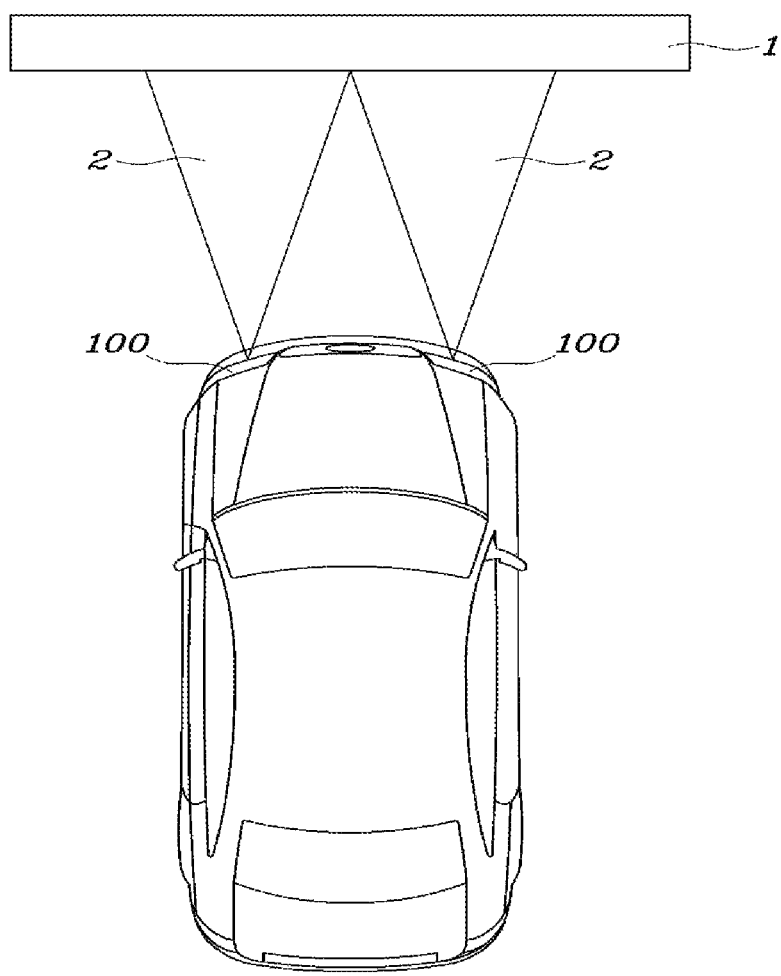
FIG. 3 is a plan view of the structure of FIG. 2.
Figure 4:
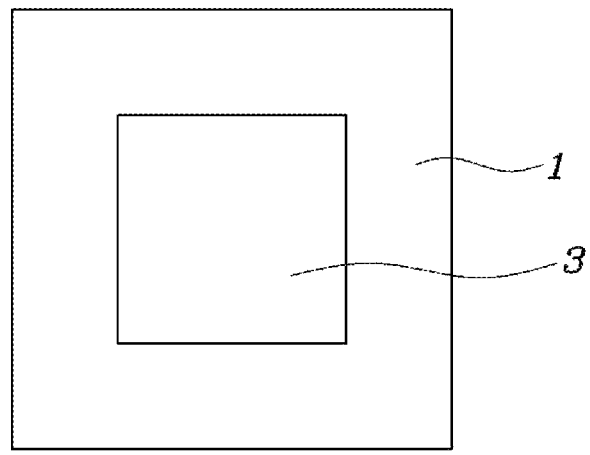
FIG. 4 is a front view of a test light image formed on the target in the state of FIG. 2 and FIG. 3.

FIG. 2 is a side view of a structure in which test light is emitted to a target 1 located ahead of the vehicle using the headlamp 100 equipped with the DMD optical system 110, FIG. 3 is a plan view of the structure of FIG. 2, and FIG. 4 is a front view of a test light image 3 formed on the target 1.

Test light 2 is externally emitted through the DMD optical system 110 and has a form in which a plurality of horizontal lines and vertical lines are disposed in a checkerboard shape by micro-mirrors 113a. When the test light image 3 formed on the target 1 is briefly illustrated, it may be represented by a rectangular shape including that shown in FIG. 4.

Figure 5:
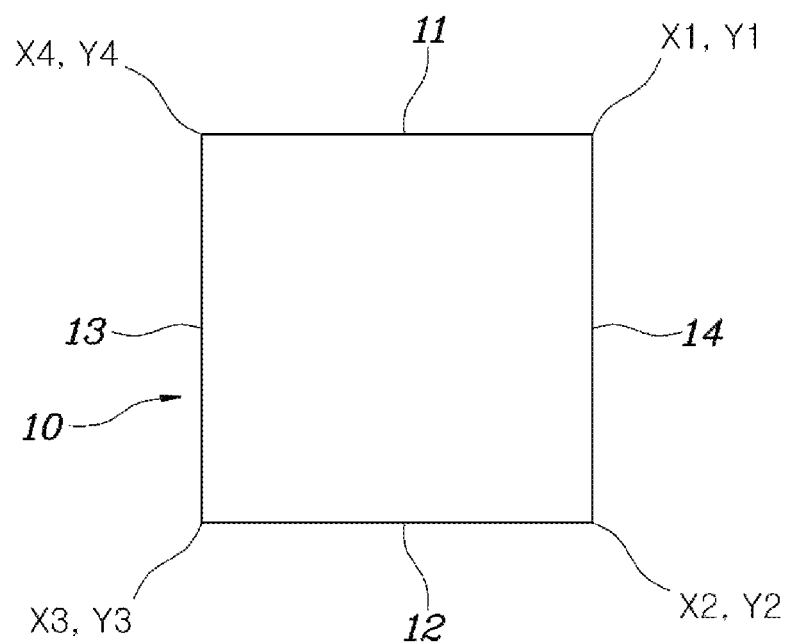
FIG. 5, FIG. 6, FIG. 7, FIG. 8, FIG. 9 and FIG. 10 are diagrams for explaining a method of automatically adjusting the leveling of a headlamp equipped with a DMD optical system according to an exemplary embodiment of the present invention.

Therefore, the image information 10 of the test light image, acquired using the camera 200, has a rectangular shape in which an upper side 11 and a lower side 12, which face each other, and a left side 13 and a right side 14, which face each other, are connected, as shown in FIG. 5.

When a state in which the target 1 located ahead of the vehicle stands vertically to a ground surface, as shown in FIG. 2, and then has no slope in a forward and backward direction at the same time that the target 1 stands in parallel to the vehicle, as shown in FIG. 3, and then has no slope in a left and right direction, is set to a base state, the image information 10 acquired using the camera 200 is an image in which two respective facing sides are parallel to each other and have the same length.

That is, the image information indicates a rectangular image in which the upper side 11 and the lower side 12 are parallel to each other and have the same length, and in which the left side 13 and the right side 14 are parallel to each other and have the same length.

By using the image information 10 acquired in the present way, the controller 400 compares the image information 10 with previous input reference information, thus automatically adjusting the leveling of the headlamp.

The controller 400 receives, as the reference information, information about various distances from the light source center of the headlamp 100 to the target 1, information about coordinate values of a specified single point when the target 1 is in a base state in which the target 1 stands vertically to the ground surface and has no slope in a forward and backward direction at the same time that the target 1 stands in parallel to the vehicle and has no slope in a left and right direction, information about various left and right slopes of the target 1, and information about various forwards and backwards slopes of the target 1.

At the comparison step, the image information compared with the reference information of the controller 400 includes first information about the coordinate values of a single point specified in the image information 10 acquired when the target 1 is in the above-described base state; second information about a distance from the light source center of the headlamp 100 to the target 1; third information about the left and slope a1 of the target 1; and fourth information about the forward and backward slope a2 of the target 1.

Here, the first information indicates coordinate values corresponding to any one selected among the coordinate values (X1, Y1) of a first corner at which the upper side 11 and the right side 14 meet in the image information 10 including that shown in FIG. 5, which is acquired when the target 1 is in the base state, the coordinate values (X2, Y2) of a second corner at which the right side 14 and the lower side 12 meet in the image information 10, the coordinate values (X3, Y3) of a third corner at which the lower side 12 and the left side 13 meet in the image information 10, and the coordinate values (X4, Y4) of a fourth corner at which the left side 13 and the upper side 11 meet in the image information 10.

Figure 6:
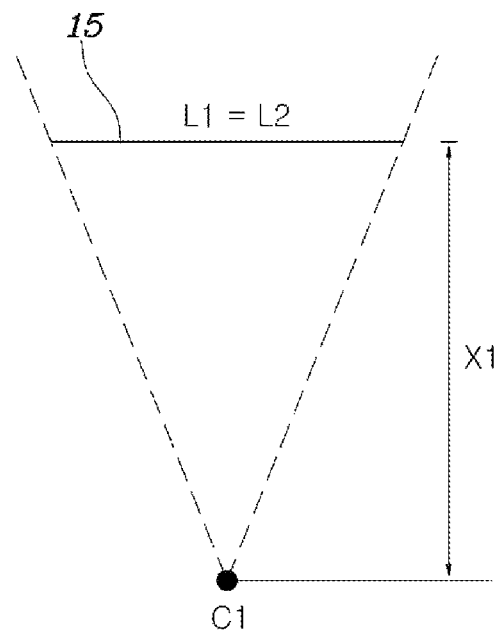

As shown in FIG. 6, the second information is configured wherein one of the upper side 11 and the lower side 12 of the image information 10 is set to a reference side 15, and wherein, when the length L1 of the reference side 15 is identical to the length L2 of the reference information that is input to the controller 400 upon comparing the lengths L1 and L2 with each other, the distance X1 from the light source center C1 of the headlamp 100 to the target 1 is set to the distance of the reference information that is input to the controller 400.

Figure 7:
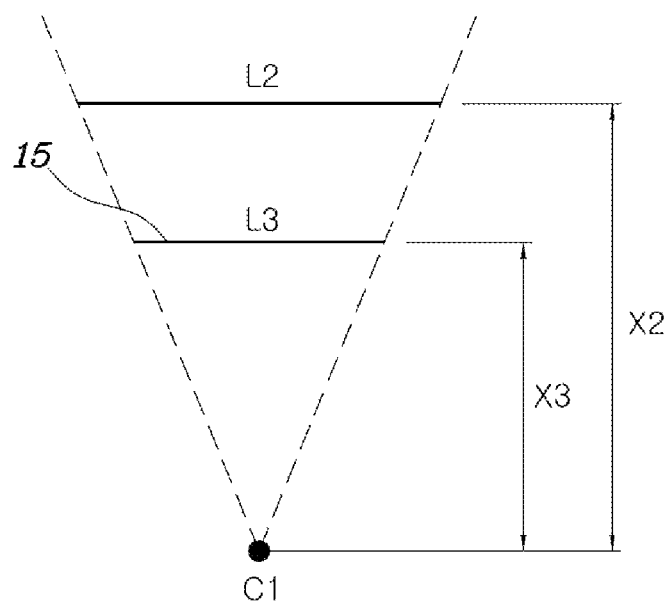

However, as shown in FIG. 7, when the length L3 of the reference side 15 is not identical to the length L2 of the reference information that is input to the controller 400, the distance X3 from the light source center C1 of the headlamp 100 to the target 1 is obtained by a proportional expression that uses the length L2 and distance X2 of the reference information input to the controller 400 and the length L3 of the reference side 15.

The proportional expression is L2:X2=L3:X3, therefore X3=X2*L3/L2 is satisfied.

As described above, after the first information (the coordinate values corresponding to any one selected from the image information acquired when the target is in the base state) and the second information (the distance from the light source center of the headlamp to the target) are obtained, the controller 400 compares the coordinate values obtained from the first information with the coordinate values of the previously input reference information, based on the distance X3 obtained from the second information. As a result of the comparison, when the coordinate values are not identical to each other, the controller 400 changes the height of the optical axis of the headlamp 100 by controlling the operation of the leveling actuator 300 until the coordinate values obtained from the first information become identical to the coordinate values of the reference information that is input to the controller, thus facilitating leveling to be automatically adjusted.

Figure 8:
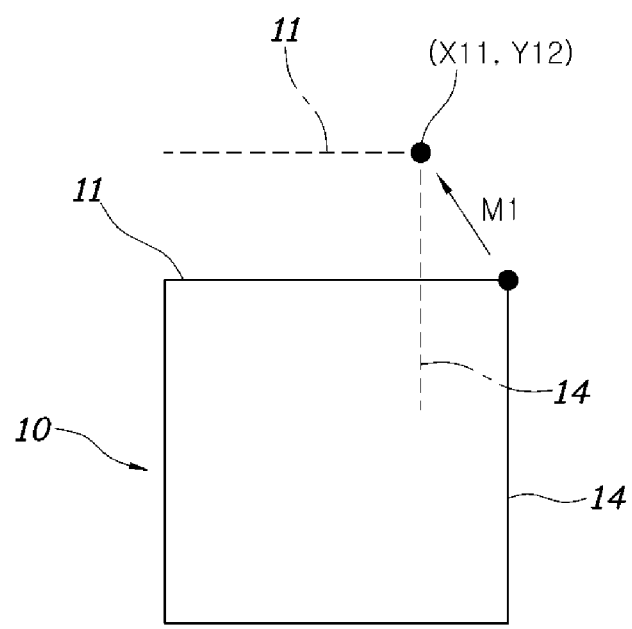

That is, as shown in FIG. 8, it is assumed that the distance from the light source center C1 of the headlamp 100 to the target 1, which is obtained using the image information 10, is X3, and that the coordinate values of a corner at which the upper side 11 and the right side 14 meet in the image information 10, which is acquired when the target 1 is in the base state, are X1 and Y2.

Also, it is assumed that, when the target 1 is in the base state and the distance from the light source center C1 to the target 1 is X3, the coordinate values of a corner at which the upper side 11 and the right side 14 of the reference information that is previously input to the controller 400 meet are X11 and Y12.

The coordinate values X11 and Y12 are standard coordinate values of the corner at which the upper side 11 and the right side 14 meet when the distance to the target 1 is X3 and the target 1 is maintained in the base state. Therefore, the controller 400 determines that the leveling of the headlamp is required because the coordinate values X1 and Y2, which are obtained using the image information 10, are not identical to the standard coordinate values X11 and Y12 previously input to the controller 400. Based on the present determination, the controller 400 changes the height of the optical axis of the headlamp 100 by controlling the operation of the leveling actuator 300 until coordinate values to be subsequently obtained from the first information become identical to the standard coordinate values X11 and Y12 of the controller 400, thus facilitating leveling to be automatically adjusted (indicated by arrow M1).

Figure 9:
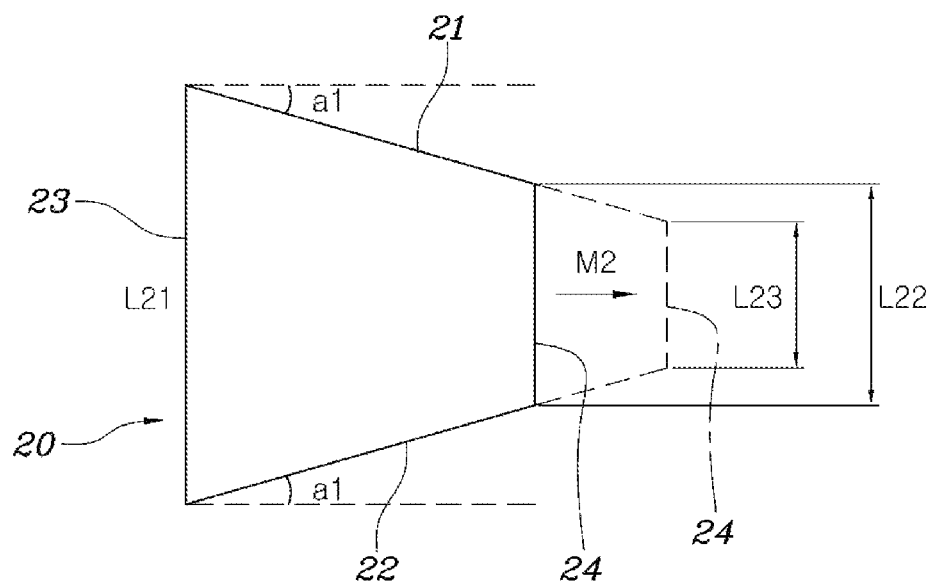

As shown in FIG. 9, the third information may be either the slope a1 of a straight line that connects the top end portion of the left side 23 of image information 20 to the top end portion of the right side 24 thereof or the slope a1 of a straight line that connects the bottom end portion of the left side 23 to the bottom end portion of the right side 24 when respective lengths L21 and L22 of the left side 23 and the right side 24 of the image information 20 are not identical to each other.

After the third information has been obtained in the present way, the controller 400 compares the respective lengths L21 and L22 of the left side 23 and the right side 24 of the acquired image information 20 with the lengths L21 and L23 of previously input reference information, based on the distance X3 obtained from the second information and the left and right slope a1 of the target 1 obtained from the third information. In the present case, when respective lengths are not identical to each other, that is, when the lengths of the right side 24 are L22 and L23, respectively, and are not identical to each other, the controller 400 automatically adjusts the left and right (horizontal) leveling of the headlamp 100 by controlling the operation of the leveling actuator 300 until the lengths of the left side 23 and the right side 24 of image information to be subsequently obtained become identical to the lengths L21 and L23 of the reference information that is input to the controller 400.

That is, it is assumed that the distance from the light source center C1 of the headlamp 100 to the target 1 is X3, and that the respective lengths of the left side 23 and the right side 24, which are obtained from the image information 20, are L21 and L22.

Also, it is assumed that, when the distance from the light source center C1 of the headlamp 100 to the target 1 is X3, the lengths of the left side 23 and the right side 24 previously input to the controller 400 are L21 and L23, respectively.

The lengths L21 and L23 of the left side 23 and the right side 24 are standard lengths when the distance to the target 1 is X3 and the left and right slope of the target 1 is a1. Therefore, the controller 400 determines that the horizontal leveling of the headlamp is required because the lengths L21 and L22 of the left side 23 and the right side 24, which are obtained using the image information 20, are not identical to the standard lengths L21 and L23 previously input to the controller 400. Based on the present determination, the controller 400 automatically adjusts the horizontal leveling of the headlamp 100 by controlling the operation of the leveling actuator 300 until the lengths of the left side 23 and the right side 24 to be subsequently obtained from the third information become identical to the standard lengths L21 and L23 of the controller 400 (indicated by arrow M2).

Figure 10:
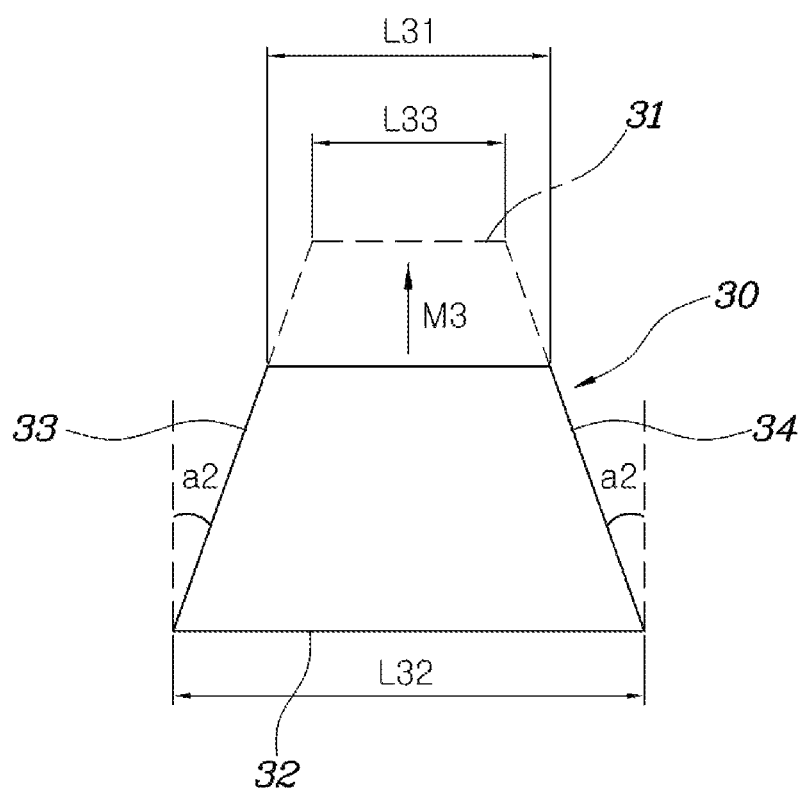

As shown in FIG. 10, the fourth information may be either the slope a2 of a straight line that connects the right end portion of the upper side 31 of image information 30 to the right end portion of the lower side 32 thereof or the slope a2 of a straight line that connects the left end portion of the upper side 31 to the left end portion of the lower side 32 when respective lengths L31 and L32 of the upper side 31 and the lower side 32 of the image information 30 are not identical to each other.

After the fourth information has been obtained, the controller 400 compares the lengths L31 and L32 of the upper side 31 and the lower side 32 of the acquired image information 30 with the lengths L33 and L32 of previously input reference information, based on the distance X3 obtained from the second information and the forward and backward slope a2 of the target 1 and the forward and backward slope a2 of the target 1 obtained from the fourth information. In the present case, when the lengths are not identical to each other, that is, when the lengths of the upper side 31 are L31 and L33, respectively, and are not identical to each other, the controller 400 automatically adjusts the upward and downward (vertical) leveling of the headlamp 100 by controlling the operation of the leveling actuator 300 until the lengths of the upper side 31 and the lower side 32 of image information to be subsequently obtained become identical to the lengths L33 and L31 of the reference information that is input to the controller 400.

That is, it is assumed that the distance from the light source center C1 of the headlamp 100 to the target 1 is X3, and that respective lengths of the upper side 31 and the lower side 32 obtained from the image information 30 are L31 and L32.

Also, it is assumed that, when the distance from the light source center C1 of the headlamp 100 to the target 1 is X3, respective lengths of the upper side 31 and the lower side 32 previously input to the controller 400 are L33 and L32.

The lengths L33 and L32 of the upper side 31 and the lower side 32 are standard lengths when the distance to the target 1 is X3 and the forward and backward slope of the target 1 is a2. Therefore, the controller 400 determines that the vertical leveling of the headlamp is required because the lengths L31 and L32 of the upper side 31 and the lower side 32, obtained using the image information 30, are not identical to the standard lengths L33 and L32 previously input to the controller 400. Based on the present determination, the controller 400 automatically adjusts the vertical leveling of the headlamp 100 by controlling the operation of the leveling actuator 300 until the lengths of the upper side 31 and the lower side 32 to be subsequently obtained from the fourth information become identical to the standard lengths L33 and L32 of the controller 400 (indicated by arrow M3).

As described above, the exemplary embodiments of the present invention are advantageous in that the leveling of the headlamp 100 configured for implementing a pixel light using the DMD optical system 110 is automatically adjusted, thus improving convenience and facilitating leveling to be more precisely adjusted.

In accordance with the present invention, there is an advantage in that the leveling of a headlamp configured for implementing a pixel light using a DMD optical system may be automatically adjusted, thus improving convenience and facilitating leveling to be more precisely adjusted.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of automatically adjusting leveling of a pixel light headlamp for a vehicle, the method automatically adjusting leveling of a headlamp equipped with a digital micromirror device (DMD) optical system, the method comprising:
a test light emission operation of emitting test light to a target located ahead of the vehicle in a state in which the vehicle is stopped;
an image information acquisition operation of acquiring a test light image formed on a surface of the target by the test light, as image information, using a camera provided in the vehicle;
a comparison operation of comparing the acquired image information of the test light image with reference information that is input to a controller; and
a leveling correction operation of, when the image information is different from the reference information, controlling, by the controller, an operation of a leveling actuator until the image information are configured to be identical to the reference information,
wherein the acquired image information related to an outer circumference of the test light image formed by the test light has a rectangular shape in which an upper side and a lower side that face each other and a left side and a right side that face each other are connected, and
wherein the image information of the test light image, acquired using the camera when the target is in a base state in which the target stands vertically to a ground surface and then has no slope in a forward and backward direction while the target stands in parallel to the vehicle and then has no slope in a left and right direction, is an image in which two respective facing sides are in parallel to each other and have an identical length,
wherein the image information compared with the reference information of the controller in the comparison operation includes:
first information about coordinate values of a single point specified in the image information acquired when the target is the base state;
second information about a distance from a source center of the headlamp to the test light image on the target which is in the base state;
third information about a left and right slope of the target which is in the base state; and
fourth information about a forward and backward slope of the target which is in the base state.

2. The method according to claim 1, wherein the first information indicates coordinate values corresponding to one selected among coordinate values of a first corner at which an upper side and a right side meet in the image information acquired when the target is in the base state, coordinate values of a second corner at which the right side and a lower side meet in the image information, coordinate values of a third corner at which the lower side and a left side meet in the image information, and coordinate values of a fourth corner at which the left side and the upper side meet in the image information.

3. The method according to claim 2, wherein the second information is configured such that:
one of the upper side and the lower side of the image information is set to a reference side,
the distance from the light source center of the headlamp to the target set to a distance of the reference information that is input to the controller when a length of the reference side is identical to a length of the reference information that is input to the controller upon comparing the lengths with each other, and
the distance from the light source center of the headlamp to the target is obtained by a proportional expression that uses the length and a distance of the reference information that is input to the controller and the length of the reference side when the length of the reference side is not identical to the length of the reference information that is input to the controller.

4. The method according to claim 3, wherein, when coordinate values obtained from the first information are not identical to coordinate values of the reference information that is input to the controller upon comparing the coordinate values with each other based on the distance obtained from the second information, the controller changes a height of an optical axis of the headlamp by controlling the operation of the leveling actuator until coordinate values to be subsequently obtained from the first information is configured to be identical to the coordinate values of the reference information that is input to the controller.

5. The method according to claim 3, wherein the third information is either a slope of a straight line that connects a top end portion of the left side of the image information to a top end portion of the right side thereof or a slope of a straight line that connects a bottom end portion of the left side to a bottom end portion of the right side when the lengths of the left side and the right side of the image information are not identical to each other.

6. The method according to claim 5, wherein, when the lengths of the left side and the right side of the acquired image information are not identical to lengths of the reference information that is input to the controller upon comparing the lengths with each other based on the distance obtained from the second information and the left and right slope of the target obtained from the third information, the controller corrects horizontal leveling of the headlamp by controlling the operation of the leveling actuator until lengths of a left side and a right side of image information to be subsequently obtained is configured to be identical to the lengths of the reference information that is input to the controller.

7. The method according to claim 3, wherein the fourth information is either a slope of a straight line that connects a right end portion of the upper side of the acquired image information to a right end portion of the lower side thereof or a slope of a straight line that connects a left end portion of the upper side to a left end portion of the lower side when the lengths of the upper side and the lower side of the acquired image information are not identical to each other.

8. The method according to claim 7, wherein, when the lengths of the upper side and the lower side of the acquired image information are not identical to lengths of the reference information that is input to the controller upon comparing the lengths with each other based on the distance obtained from the second information and the forward and backward slope of the target obtained from the fourth information, the controller corrects vertical leveling of the headlamp by controlling the operation of the leveling actuator until lengths of an upper side and a lower side of image information to be subsequently obtained is configured to be identical to the lengths of the reference information that is input to the controller.

\* \* \* \* \*